(12) United States Patent
Balasubramanian

(10) Patent No.: US 9,906,316 B2
(45) Date of Patent: Feb. 27, 2018

(54) SYSTEM AND METHOD FOR DETERMINING PHASE CHANGE

(71) Applicant: TEXAS INSTRUMENTS INCORPORATED, Dallas, TX (US)

(72) Inventor: Sidharth Balasubramanian, Garland, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/171,781

(22) Filed: Jun. 2, 2016

(65) Prior Publication Data

US 2017/0019192 A1 Jan. 19, 2017

Related U.S. Application Data

(60) Provisional application No. 62/193,950, filed on Jul. 17, 2015.

(51) Int. Cl.
*H04B 17/16* (2015.01)
*H04B 17/10* (2015.01)

(52) U.S. Cl.
CPC .......... *H04B 17/104* (2015.01); *H04B 17/16* (2015.01)

(58) Field of Classification Search
CPC ...... H04B 17/19; H04B 3/462; H04B 17/104; H04B 17/16; G01R 31/31709; G01R 31/31716; G01R 31/3187; G01R 31/2843; H05B 6/686; H05B 6/705; H05B 6/72
See application file for complete search history.

(56) References Cited

U.S. PATENT DOCUMENTS

| 4,027,107 A * | 5/1977 | Eilers | H04S 3/02 381/5 |
|---|---|---|---|
| 4,034,240 A * | 7/1977 | Foreman | H03K 5/08 327/184 |
| 2006/0009938 A1* | 1/2006 | Roger | G01R 29/26 702/107 |
| 2006/0044065 A1* | 3/2006 | Ishida | H03G 3/3026 330/279 |

* cited by examiner

*Primary Examiner* — Vineeta Panwalkar
(74) *Attorney, Agent, or Firm* — Gregory J. Albin; Charles A. Brill; Frank D. Cimino

(57) ABSTRACT

A system and method for measuring phase variations in signals are disclosed. The system and method may be integrated inside a circuit pack in the form of a built-in-self-test (BIST) unit. The BIST provides predetermined periodic attenuation to an input signal and determines phase variation in output signal due to applied attenuations by measuring sideband power of the output signal.

19 Claims, 5 Drawing Sheets

SYSTEM AND METHOD FOR DETERMINING PHASE CHANGE

CROSS-REFERENCE TO RELATED APPLICATIONS

This application claims priority to the U.S. provisional patent application Ser. No. 62/193,950, filed Jul. 17, 2015, the entirety of which is hereby incorporated herein by reference for all purposes.

TECHNICAL FIELD

This disclosure relates generally to the field of signal processing and more particularly to measuring signal distortion.

BACKGROUND

Systems such as attenuators and Digital-to-Analog Convertors (DAC) often suffer from phase variations in the output when the attenuation value or digital scaling is changed. Generally, typical systems have sufficient tolerance built-in to accommodate for minor phase variations; however, for applications such as electronic warfare, surveillance, missile systems, synthetic aperture radars, software radio and for others, even minor change in signal phase can significantly degrade the overall system performance. To address needs of such applications, systems are designed to exhibit minimal phase variation; however, it is very challenging to accurately measure the effective minor phase change of an output signal, unless the system fails to perform as intended.

When input signals get attenuated for various reasons in a system, the attenuation process not only changes the amplitude but also varies the phase of output signals. Because amplitude and phase vary together in the output signal, they cannot be accurately separated and measured for system performance. To measure minor phase variation generally requires specialized and expensive (e.g. typical cost >$100 k) Testers, and oscilloscopes, which limit the ability to use off the shelf, low-cost automated test equipment (ATE).

SUMMARY

In accordance with an embodiment a device is disclosed. The device includes a signal selection unit configured to select one of a plurality of attenuation step signals, signal processing circuitry coupled to the signal selection unit and configured to process an input signal with the selected one of the plurality of attenuation step signals and generate an attenuated output signal, wherein the attenuated output signal has non-uniform amplitude; and a waveform convertor coupled to the signal processing circuitry and configured to convert the attenuated output signal into a uniform amplitude attenuated output signal.

In accordance with another embodiment, a method is disclosed. The method includes applying one or more attenuation step signals to an input signal to generate an attenuated output signal, wherein the attenuated output signal has non-uniform amplitude; and converting the attenuated output signal into a uniform amplitude output signal.

In accordance with yet another embodiment, an integrated circuit is disclosed. The integrated circuit includes circuitry for Built-In-System-Test (BIST) unit, and circuitry for signal processing coupled to the BIST unit and configured to process an input signal, wherein the BIST unit includes a signal selection unit configured to select one of a plurality of attenuation step signals, and a waveform convertor coupled to the signal processing circuitry and configured to convert an output signal of the circuitry for signal processing into a uniform amplitude output signal.

DETAILED DESCRIPTION

The following description provides many different embodiments, or examples, for implementing different features of the subject matter. These descriptions are merely for illustrative purposes and do not limit the scope of the invention.

According to an embodiment, a system and method for measuring phase variations due to attenuation in signals are disclosed. The system and method may be integrated inside a circuit pack in the form of a built-in-self-test (BIST) unit. The BIST is configured to provide predetermined periodic attenuation steps to an input signal and determine phase variation in output signal due to applied attenuation steps by measuring sideband power of the output signal.

Figure 1A:
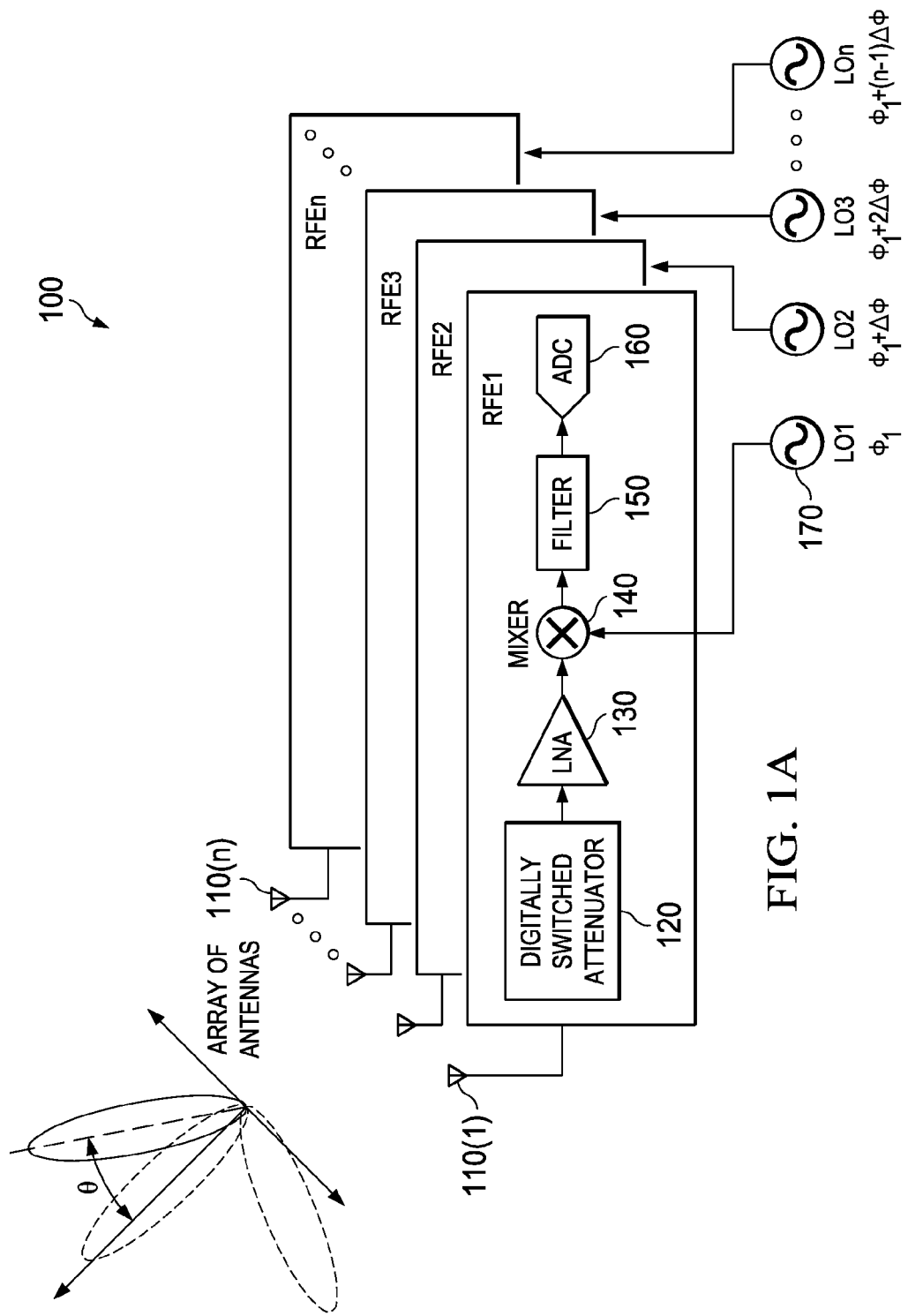
FIG. 1A illustrates an exemplary signal receiving system that induces deterministic phase variations and attenuation according to an embodiment.

Referring to FIG. 1A, an exemplary receiving system 100 that induces deterministic phase variations and attenuation is illustrated according to an embodiment. System 100 includes various antenna arrays (e.g., an array of antenna elements) and their radio front-ends, RFE1-RFEn. These antenna arrays may perform beamforming for reception of signals in a particular given direction. An equivalent structure also exists for signal transmission, or beam-steering. The phase of signal of each one of the antenna elements in an array may differ from the other by a given angle θ. Each antenna array RFE includes a digitally switched attenuator 120, an amplifier 130, a mixer 140, a filter 150, an analog to digital converter 160, and a local oscillator 170. The local oscillator 170 provides frequency and phase for beamforming for each one of the antenna arrays. The phase of each local oscillator Φ differs from the other by a predetermined difference ΔΦ. When a signal received by the antenna array is attenuated for various signal processing reasons, the attenuation process not only attenuates the amplitude of the signal but also affects the phase of the signal, which may degrade the performance of the antenna array as stated hereinabove.

Figure 1B:
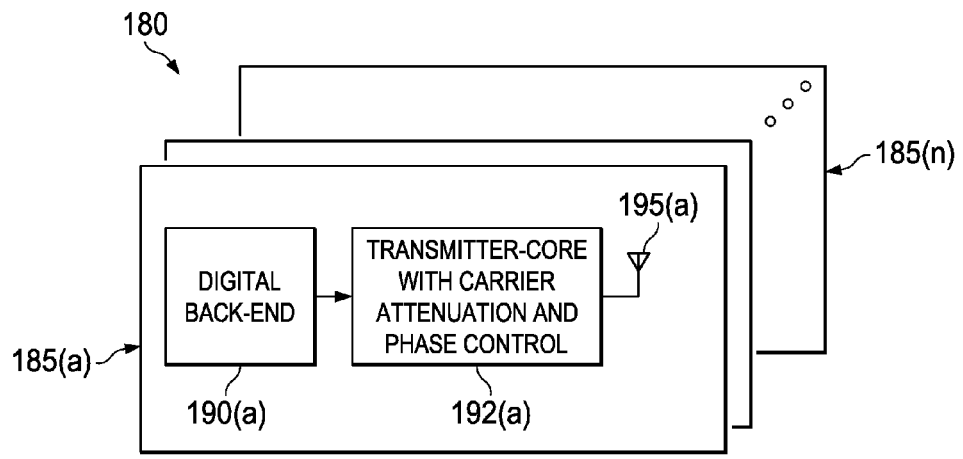
FIG. 1B, illustrates an exemplary signal transmission system that induces deterministic phase variations and attenuation according to an embodiment.

Referring to FIG. 1B, an exemplary transmission system 180 that induces deterministic phase variations and attenuation is illustrated according to an embodiment. The transmission system 180 includes various transmitter arrays 185(a)-(n). Each of the transmitter arrays 185(a)-(n) may include respective digital back-end units (e.g., digital back-end unit 190(a)), transmitter core units (e.g., transmitter core unit 192(a)), and antennas (e.g., antenna 195(a)). These antenna arrays may perform beam-steering for transmission of signals in a particular given direction. The phase of signal of each one of the elements in the antenna array may differ from the other by a given angle θ.

Figure 2:
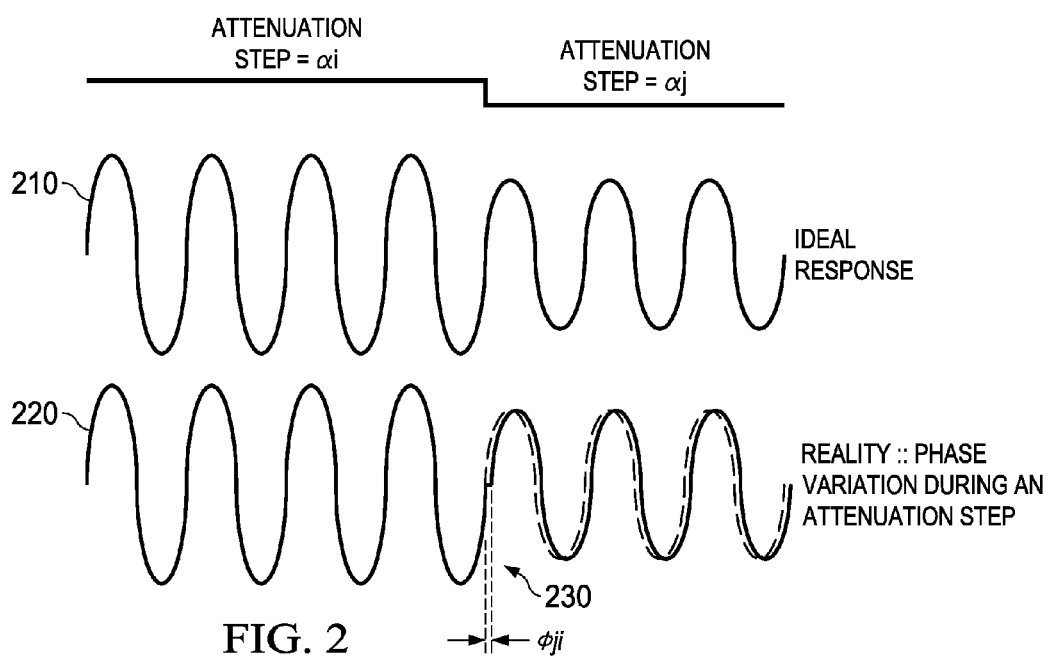
FIG. 2 illustrates an example of phase variation due to signal attenuation.

Referring to FIG. 2, an example of phase variation due to signal attenuation is illustrated. As illustrated, a sinusoidal signal is attenuated using a two-step process with attenuation step values of αi and αj. Typically, the attenuation may result in an ideal response waveform 210; however, due to various system component imperfections and various other system related causes, the actual response waveform will be as illustrated by 220. After the attenuation step αj, the signal also loses some of its phase and the phase of the output signal varies by a function of Φji. The phase variation due to the attenuation degrades system performance. When the phase variation Φji is very small (e.g., less than 5 degrees), then it becomes challenging to measure the phase difference during device testing and may result in system failure in field application if the phase change is not accurately detected during the initial testing.

Figure 3:
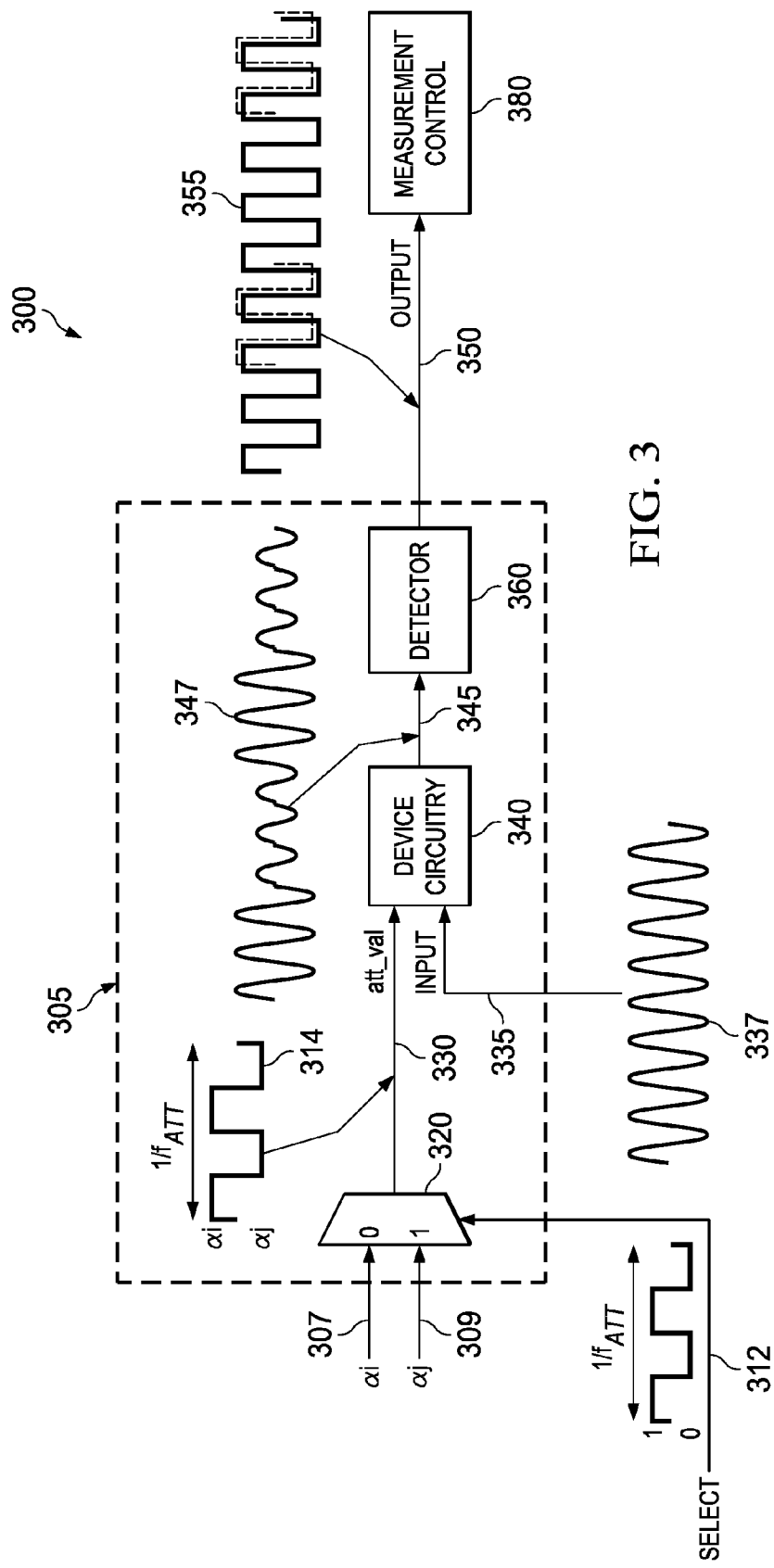
FIG. 3 illustrates a system for measuring phase variation due to attenuation according to an embodiment.

Referring to FIG. 3, a system 300 for measuring phase variation due to attenuation is illustrated according to an embodiment. System 300 includes a device 305. The device 305 may be any integrated circuit that enables the validation of an attenuating block such as for example unit 120 as illustrated in FIG. 1. The device 305 includes internal device circuitry 340 for performing various signal processing functions for the device. The device circuitry 340 can be any signal processing circuitry suitable for performing functions of the device 305. The device 305 includes a 2×1 multiplexer 320. The multiplexer 320 may provide attenuation step signals for device circuitry 340. The multiplexer 320 selects a signal attenuation step from among two inputs 307 (αi) and 309 (αj) based on a select signal 312. While for exemplary purposes 2×1 multiplexer is illustrated as an exemplary signal selection unit; however, multiplexer 320 may be configured to select among more than two input signals. According to an embodiment, the multiplexer 320 may be a processing unit configured to select a signal from many signals (e.g., a cross-connect switch). Input signals 307 and 309 may be any attenuation steps that may be used on the input signal of the device 305. The attenuation steps may be configured according to the internal actual attenuation functions of the device 305 or may be configured independently for test and measurement purposes.

The output 330 of multiplexer 320 includes attenuation step signal att_val as illustrated by 314 at a frequency $f_{ATT}$, which may be any frequency chosen to test the attenuation function of the device 305. In the exemplary embodiment, the select signal 312 alternates between any two settings of the multiplexer 320, at the rate of $f_{ATT}$, which results in the output att_val to alternate between two settings at the rate of $f_{ATT}$. The select signal 312 can be generated by any known signal generated. The device 305 may receive analog signals such as signal 337 at its input 335. The input signal 337 may be subjected to the attenuation steps 314 to determine the impact of attenuation on the phase of the output signal 347. When the input signal 337 is subjected to the attenuation att_val, the input signal may result in an output signal 347 at the output 345 of the device circuitry 340.

The output signal 347 represents amplitude attenuation corresponding to the attenuation steps 314. Due to the selective application of the attenuation step 314, the amplitude of the output signal 347 is non-uniform reflecting the selective amplitude attenuation. While the amplitude of the output signal 347 is attenuated, a phase of the output signal 347 also changes as a result of the amplitude attenuation. As stated hereinabove, in certain precision based application systems, a minor deviation in signal phase may result in significant system malfunction; for example, a minor phase difference in a missile trajectory may generate catastrophic consequences. It is therefore desired to determine the minor phase change resulting in the input signal due to the amplitude attenuation in the device 340 prior to the deployment of the device 340 in the field systems. The device 305 may be a background loop-back system that facilitates characterizing device circuitry 340.

Typically, minor variation in signal phase cannot be measured during device testing because of the requirements of sophisticated phase measurement test equipment. According to an embodiment, the BIST system in device 305 includes a detector 360. The detector 360 may be a circuit configured to convert incoming output signal 347 with amplitude and phase variations into a uniform amplitude signal such as for example a square wave signal 355 at the output of the device 305. The square wave signal 355 has uniform amplitude but preserves the phase variations of the output signal 347 due to the attenuation signal att_val. When the input signal 337 is attenuated by the attenuation signal att_val, the attenuation of the input signal 337 is reflected in the output signal 347 along with the phase variations caused by the attenuation.

The detector 360 generates a representation of output signal 347 as a uniform amplitude waveform (e.g., square waveform) 355 while preserving the phase variations due to the attenuation. The output signal 355 has uniform amplitude; however, it retains the phase variation of the output signal 347. Because the uniform amplitude waveform signal 355 (e.g., square wave) only exhibits phase difference, it may be processed by any test measurement control unit such as for example, measurement control unit 380 to measure the phase variations due to the attenuation. While for exemplary purposes measurement control unit 380 is shown to be off ship; however, measurement control unit 380 can be integrated in the device 305.

Figure 7:
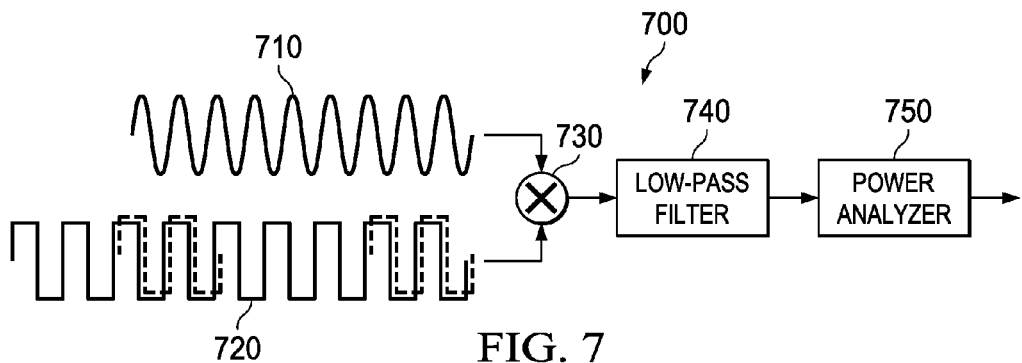
FIG. 7 illustrates a system for observing and measuring sideband power of an attenuated signal in the baseband according to an embodiment.

The detector 360 may be any waveform conversion circuit configured to convert incoming signal with various attenuations into a signal with significantly uniform amplitude while preserving any phase variations in the incoming signal. For example, the detector 360 may be a comparator, a squaring circuit, a threshold detector, and the like. The measurement control unit 380 may be any signal measurement unit, such as a Fast Fourier Transform (FFT) engine or an implementation based measurement unit such as for example unit 700 as illustrated in FIG. 7 and described herein below. Because the device 305 includes a BIST such as for example measurement control unit 380 for measuring and verifying minor phase variations due to signal attenuation, the device 305 may be tested and verified prior to the deployment in the field. For example, during device test phase, varying attenuation signals 307 (αi) and 309 (αj) may be provided to the device 305 along with a representation of input signal 337 and any minor phase variations due to the input attenuation signals 307 ($\alpha i$) and 309 ($\alpha j$) may be measured at the output 350 of the device 305. The BIST in device 305 significantly improves device yields and reduces field failures.

Figure 4:
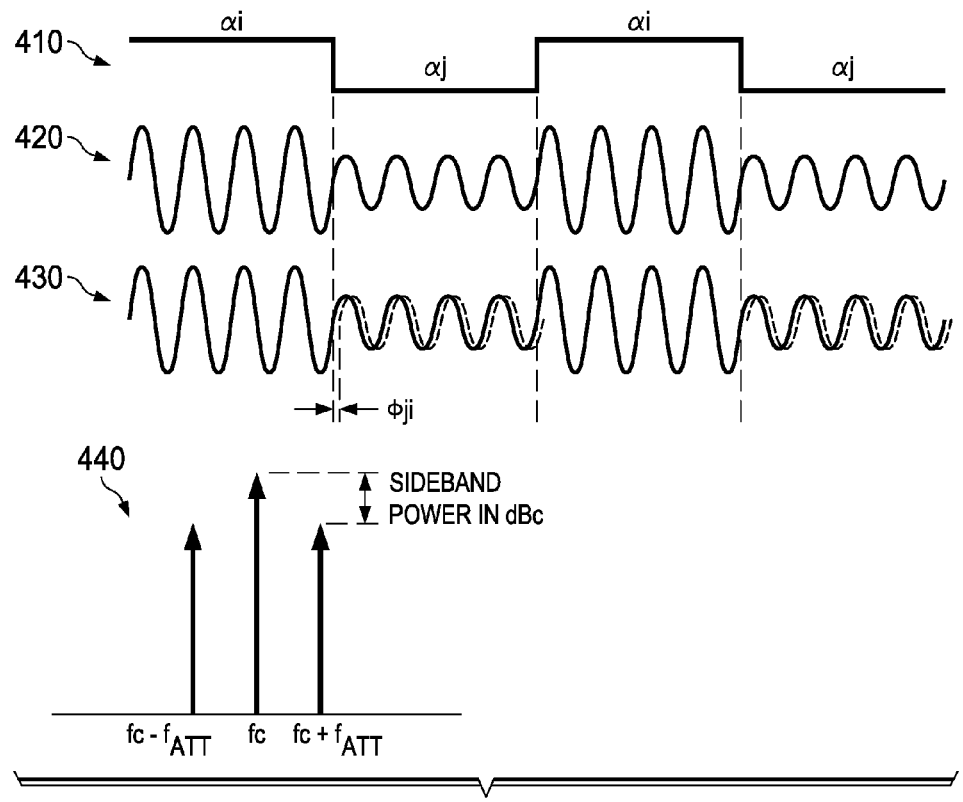
FIG. 4 illustrates an example of measuring phase variations due to attenuation using sideband power according to an embodiment.

Referring to FIG. 4, an example of measuring phase variations due to attenuation using sideband power is illustrated according to an embodiment. The periodic attenuation signal 410 includes two attenuation steps $\alpha i$ and $\alpha j$. While for explanation purposes, only two attenuation steps are illustrated; however, any number of attenuation steps in signal 410 may be included based on a given test environment. When the periodic attenuation step signal 410 is applied to an input analog sinusoidal signal then it may result in ideal periodic attenuated signal 420 representing the periodic attenuation steps of signal 410. In practice, the attenuation does not only result in amplitude attenuation but it also affects the phase of the attenuated signal as illustrated in 430. The attenuated signal 430 also reflects a phase shift due to the attenuation. The phase shift due to the attenuation is illustrated as $\Phi ji$.

The power spectrum 440 of the attenuated signal 430 shows two sidebands of the input signal. Due to the attenuation of the input signal at the rate of $f_{ATT}$, the carrier frequency fc of the input signal results in two sidebands, such that each sideband is separated from the carrier frequency fc by a difference of the attenuation signal frequency $f_{ATT}$. Thus the power spectrum 440 of the attenuated signal 430 represents a sideband at fc+$f_{ATT}$ and fc-$f_{ATT}$. The difference in sideband power is a function of $\alpha i$, $\alpha j$ and $\Phi ji$. Thus by measuring the sideband power difference in decibels relative to carrier (dBc), the phase variation due to the attenuation can be determined.

Figure 5:
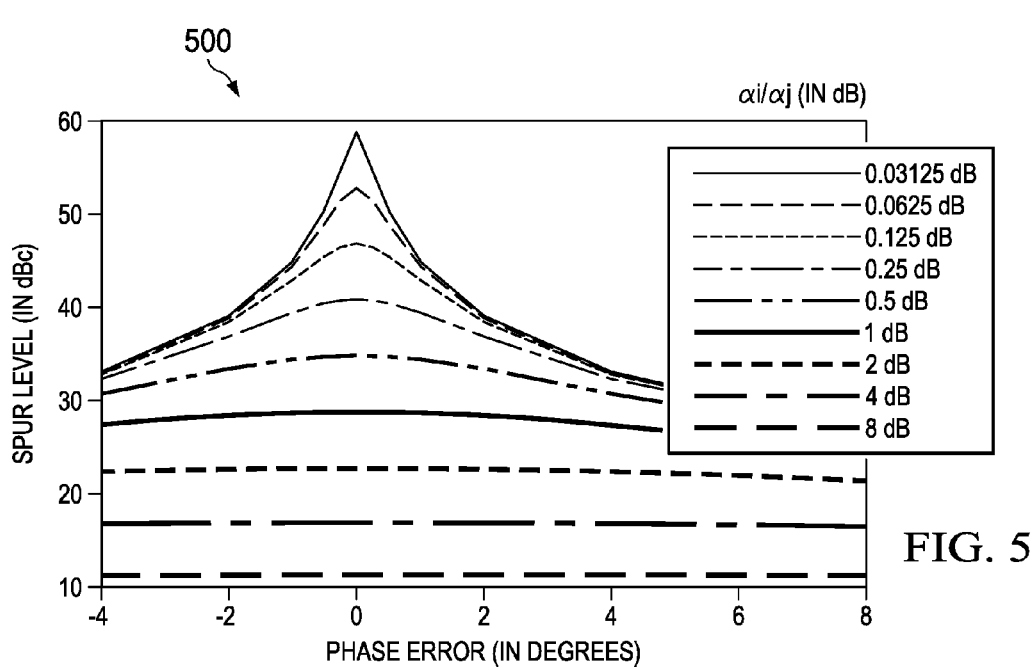
FIG. 5 illustrates an exemplary sideband power vs. phase variation plot, for measuring phase variation due to attenuation according to an embodiment.

Referring to FIG. 5, an exemplary sideband power vs. phase variation measurement plot 500 for measuring phase variation due to attenuation is illustrated according to an embodiment. By measuring the sideband power of the attenuated signal, phase variation in the attenuated signal can be determined. The spectrum 500 illustrates various sideband power measurements based on the relationship of attenuation factors $\alpha i/\alpha j$ in dB. As illustrated, when the sideband power spur level is 38 dBc, for attenuation factors given by $\alpha i/\alpha j$=0.0625 dB, the phase variation of the input signal can be determined to be about +/− two degrees. Similarly, when the sideband power spur level was 38 dBc for attenuation factors given by $\alpha i/\alpha j$=0.25 dB, then the phase variation can be extracted to be about +/−1.5 degrees. For higher attenuation factors, such an extraction of phase deviation becomes challenging. As illustrated in the exemplary sideband power spectrum, when the sideband power spur level is ~16 dBc based on $\alpha i/\alpha j$ of 8 dB, then it cannot be determined accurately whether the phase variation is zero or 8 degree or above. While for exemplary purposes, a given measurement plot is illustrated based on particular values of attenuation factors $\alpha i$ and $\alpha j$; however, any combination of sideband power vs. phase variation measurement plot can be generated based on the values of attenuation factors used for a given measurement.

Figure 6:
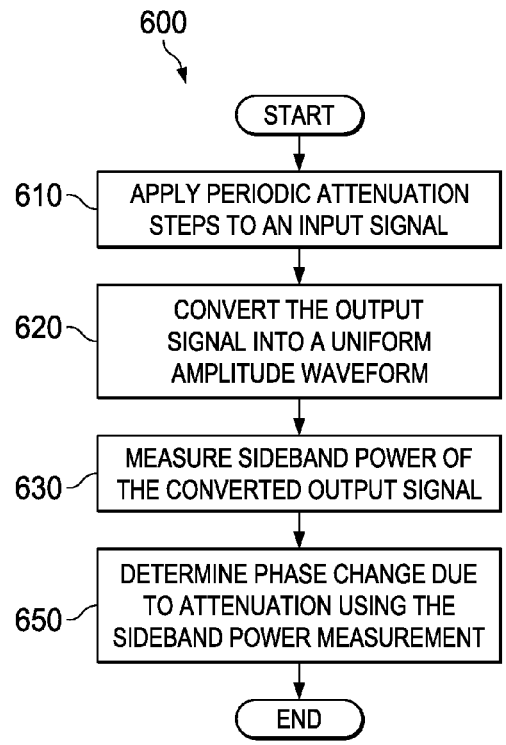
FIG. 6 illustrates an exemplary flow diagram of a BIST process for determining phase variations in a signal due to attenuation according to an embodiment.

Referring to FIG. 6, an exemplary flow diagram 600 of a BIST process for determining phase variations in a signal of a device under test due to attenuation is illustrated according to an embodiment. At 610, one or more periodic attenuation steps are applied to an input signal. The attenuation steps such as $\alpha i$ and $\alpha j$ can be determined based on the signal requirements and typical signal attenuation characteristics of circuitry of the device under test. When the input signal is attenuated, its phase varies due to the attenuation. At 620, the attenuated signal is converted into a signal with uniform amplitude without affecting the phase change for example, the attenuated signal may be processed by a comparator, squaring circuit, threshold detector and the like. A squaring circuit preserves the phase variations of an input signal while converting the signal into a uniform amplitude square waveform. At 630, the sideband power of the uniform amplitude waveform (e.g., square waveform) is measured. As stated hereinabove, the ratio of signal to sideband power of the attenuated signal is a function of corresponding phase change thus dependence on attenuation step can be neglected since the signal amplitude has been made uniform. At 650, the phase change of the attenuated signal is determined using the sideband power measurement such as for example as illustrated in FIG. 5.

Referring to FIG. 7, a system 700 for observing and measuring sideband power of an attenuated signal in the baseband is illustrated according to an embodiment. System 700 may be integrated in a device such as for example device 305 as illustrated in FIG. 3. Further, system 700 may also be integrated into any off-chip measurement and control system. System 700 may receive an output of the detector 360 as illustrated in FIG. 3. The system 700 converts amplitude differences of a high-frequency signal into a low-frequency signal, such as at or near DC (or zero frequency). A sinusoidal signal 710 may be the original un-attenuated signal received at the input of any device under test. Sinusoidal signal 710 could also be a detected constant amplitude square-wave version of the original un-attenuated signal. A square wave signal 720 may be attenuated signal converted into a square waveform such as for example the square waveform signal 355 as illustrated in FIG. 3. Both signals 710 and 720 are mixed and down converted by a mixer 730 to produce a baseband signal. The mixer 730 could be any circuit configured to enable a baseband analysis, such as an analog/RF mixer or digital logic gates, and the like. The baseband signal can then be filtered using a low pass filter 740. The filtered baseband signal may be processed by a Power Analyzer 750 to convert the baseband signal into digital form.

According to an embodiment, the Power Analyzer 750 may be any Analog-to-Digital Converter (ADC) for example a low-speed ADC, followed by a digital engine, configured to extract the sideband power of the attenuated signal for measurements such as for example as illustrated in FIG. 5. According to another embodiment, the power analyzer 750 may alternatively be configured as an all analog unit configured to extract the sideband power of the attenuated signal in the analog domain. Both analog and digital versions of the output of power analyzer 750 may be used in a feedback loop to alter the composite elements of device circuitry 340 for a given BIST application.

Measuring the sideband power of an attenuated signal that has gone through waveform conversion, enables the measurement of minor phase variations without the use of sophisticated test equipment. The solutions described hereinabove may be implemented as a BIST unit in any given integrated circuit. It enables the measurement of low-phase variation subsystems (e.g., digital-to-analog converters, attenuators, and others) that may be implemented in multi-path systems for example phased-arrays and beamformers. By integrating the system and methods described herein according to various embodiment into a device (e.g., integrated circuit) enables on-chip phase variation testing even for minor phase change.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A device comprising:
    a signal selection unit configured to select one of a plurality of attenuation step signals;
    signal processing circuitry coupled to the signal selection unit and configured to process an input signal with the selected one of the plurality of attenuation step signals and generate an attenuated output signal, wherein the attenuated output signal has non-uniform amplitude; and
    a waveform converter coupled to the signal processing circuitry and configured to convert the attenuated output signal into a uniform amplitude attenuated output signal.

2. The device of claim 1, wherein the signal selection unit is a two-by-one multiplexer.

3. The device of claim 1, wherein the waveform converter is one of
    a squaring circuit;
    a threshold detector; and
    a comparator.

4. The device of claim 1, wherein the attenuated output signal is a sinusoidal waveform and the uniform amplitude attenuated output signal is a square waveform.

5. The device of claim 1, further comprising:
    a measurement unit coupled to the waveform converter and configured to convert an amplitude difference of the attenuated output signal into a low frequency signal, wherein the measurement unit includes a signal mixer.

6. The device of claim 1, wherein a phase of the attenuated output signal is different than the phase of the input signal.

7. The device of claim 1, wherein the attenuated output signal and the uniform amplitude attenuated output signal have a same phase.

8. The device of claim 6, wherein a sideband power of the uniform amplitude attenuated output signal corresponds to a difference between phases of the input signal and the attenuated output signal.

9. The device of claim 1, wherein the signal selection unit is further configured to select the one of the plurality of attenuation step signals at a particular frequency.

10. A method comprising:
    applying one or more attenuation step signals to an input signal to generate an attenuated output signal, wherein the attenuated output signal has non-uniform amplitude;
    converting the attenuated output signal into a uniform amplitude output signal; and
    measuring sideband power of the uniform amplitude output signal, wherein the sideband power corresponds to a difference between phases of the input signal and the attenuated output signal.

11. The method of claim 10, wherein the uniform amplitude output signal is a square waveform signal.

12. The method of claim 10, wherein the attenuated output signal is a sinusoidal signal.

13. The method of claim 10, wherein the input signal is a radio frequency signal.

14. An integrated circuit comprising:
    circuitry for signal processing configured to process an input signal,
    a Built in System Test (BIST) unit coupled to the circuitry for signal processing,
        wherein the BIST unit comprises:
            a signal selection unit configured to select one of a plurality of attenuation step signals, and
            a waveform converter coupled to the circuitry for signal processing and configured to convert an output signal of the circuitry for signal processing into a uniform amplitude output signal.

15. The integrated circuit of claim 14, wherein
    the BIST further comprises a measurement unit coupled to the waveform converter and configured to convert an amplitude difference of the attenuated output signal into a low frequency signal, wherein the measurement unit includes a signal mixer,
    the circuitry for signal processing is further configured to process the input signal with the selected one of the plurality of attenuation step signals and generate an attenuated output signal, wherein the attenuated output signal has non-uniform amplitude, and
    the waveform converter is configured to convert the attenuated output signal into a uniform amplitude attenuated output signal.

16. The integrated circuit of claim 14, wherein the signal selection unit is a two-by-one multiplexer, and the waveform converter is one or more of
   a squaring circuit;
   a threshold detector; and
   a comparator.

17. The integrated circuit of claim 15, wherein the attenuated output signal is a sinusoidal waveform and the uniform amplitude attenuated output signal is a square waveform.

18. The integrated circuit of claim 15, wherein
   a phase of the attenuated output signal is different than a phase of the input signal; and
   the attenuated output signal and the uniform amplitude attenuated output signal have a same phase.

19. The integrated circuit of claim 18, wherein a sideband power of the uniform amplitude attenuated output signal corresponds to a difference between phases of the input signal and the attenuated output signal.

* * * * *